United States Patent Office 3,506,350
Patented Apr. 14, 1970

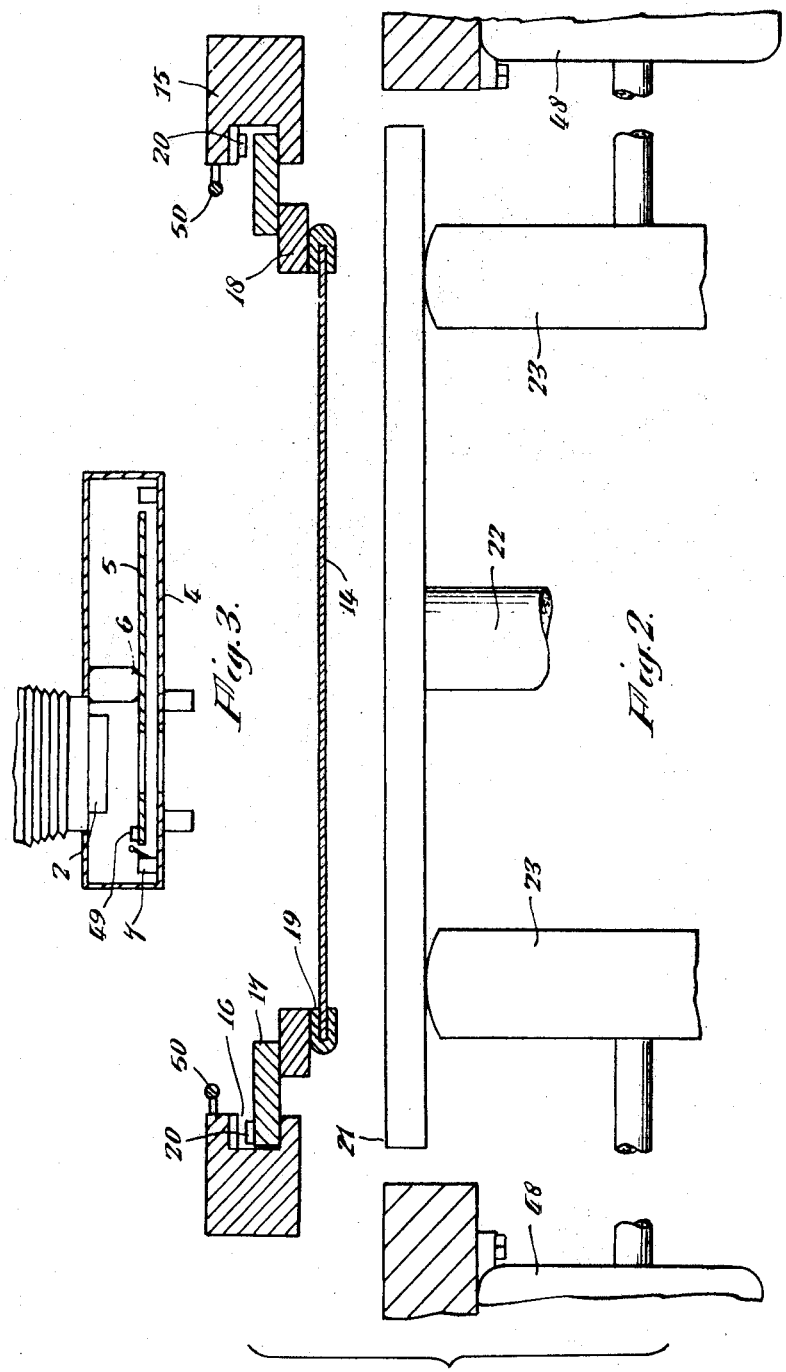

3,506,350
PHOTOGRAPHIC ENLARGER FOR HALF-TONE COLOR PRINTING
James R. Denner, Shepton Mallet, England, assignor to W. H. Howson Limited, Leeds, England, a company of Great Britain
Filed Mar. 21, 1967, Ser. No. 624,772
Claims priority, application Great Britain, Mar. 24, 1966, 12,946/66
Int. Cl. G03b 27/66
U.S. Cl. 355—40                           6 Claims

ABSTRACT OF THE DISCLOSURE

A photographic enlarger for preparing colour separation records for half-tone printing has a half-tone screen which is moved by an air cylinder and piston to and from the easel of the enlarger, and is set rotationally, before being brought to the easel, by an automatically operating turntable. The interaction of the screen mount and the turntable is caused by lowering the screen mount onto the turntable as the half-tone screen is returned to its rest (out of use) position. This is performed by tilting the carriage on which the frame is supported for its movements. A clear screen is also movable to and from the easel by power means. The operation of all these power means (and of an automatic filter changer and presensitizing controls for light-value determining probes) may be controlled by the operation of a single multi-gang switch, either manually or automatically.

BACKGROUND

Figure 1:
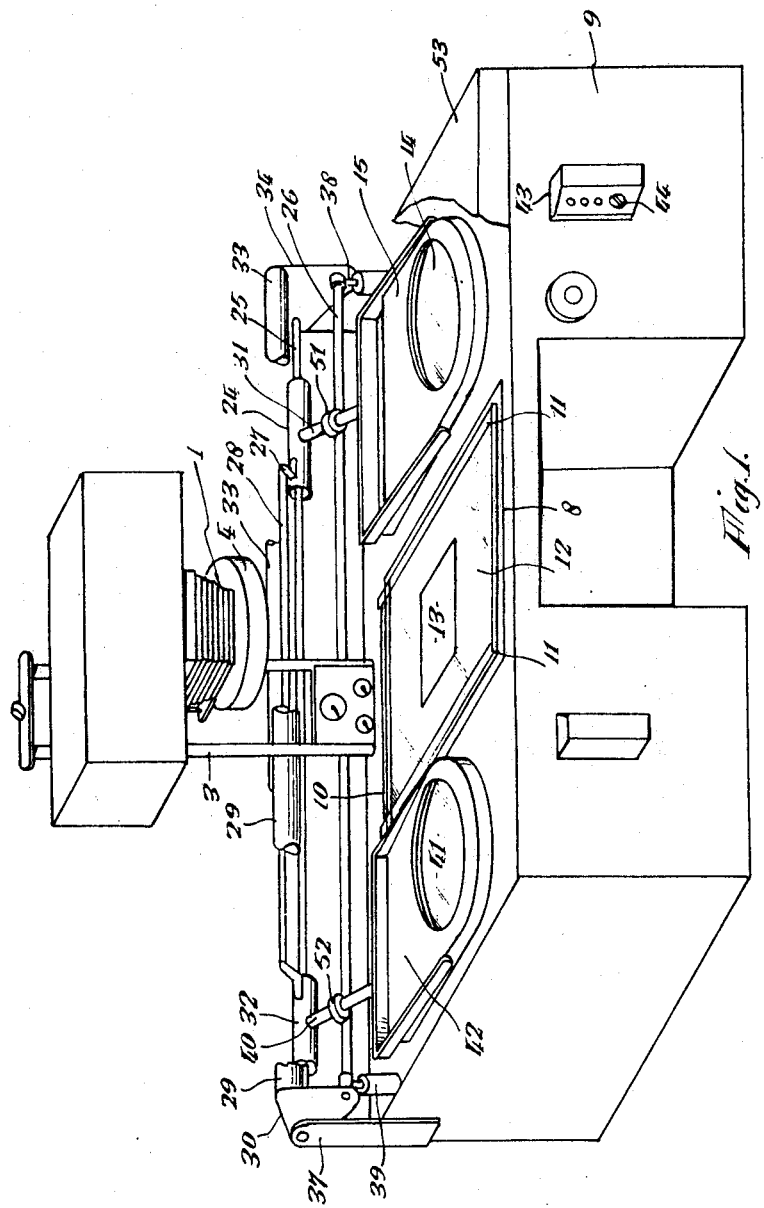

The preparation of colour separation records for half-tone printing is an involved process.

There have to be as many exposed areas of photographic material as there are to be colour components in the finished work. Usually this is four. Each time a fresh calculation of exposures needed has to be made because three of the exposures are through filters to form the cyan, magenta and yellow records and one is sometimes without filter (black record). Each filter cuts down the amount of light falling on the easel by a different amount and alters the balance between highlight and shadow parts of the image.

Then, when the total value of exposures are established, conventionally, at least two separate exposures have to be given to each area of material, one to form the image through the half-tone screen, and one ("flash exposure") to provide a dot fill-in in shadow areas. It is also conventional to give an additional exposure without the half-tone screen. This procedure has to be followed for each record. In between the sets of exposures for the various records, the filters and the angle of the half-tone screen has to be changed. Half-tone screens have to be set at a different angle in the preparation of successive separation records to avoid the production of interference ("moiré") patterns on the final print from these records.

Each of these steps is lengthy and needs some manual dexterity.

It is an object of the invention to provide an enlarger which is very largely automatic in operation to speed up the carrying out of this involved process—the preparation of half-tone colour separation records from a transparency.

SUMMARY OF THE INVENTION

According to the invention I provide a photographic enlarger in which power means are provided for moving a half-tone contact screen to and away from the easel of the enlarger, and for setting the contact screen rotationally before placing it on the easel.

The enlarger may additionally provide power means for placing a clear screen (for producing a margin on the finished record) on the easel and for removing it from the easel both at a time when the easel is not occupied by the half-tone contact screen. Further, the enlarger may provide means for automatically regulating the sequence of operations on photographic material on the enlarger so that an exposure is taken on one piece of material through the contact screen and through the clear screen without intervention by an operator. A filter mount bearing filters appropriate to the preparation of colour separation records may be movably mounted between the light source of the enlarger and the easel, to place alternatively in position any one of a plurality of coloured filters, and means may control the movement of this mount for successive positioning of filters in the light path between the transparency and the record being prepared. This positioning may occur simultaneously with the initiation of positioning of the half-tone screen or the clear screen.

The power means for setting the angular position of the half-tone contact screen may include means for driving it in rotation in a frame in which it is borne when the screen is in a rest position away from the easel. The means driving it in rotation may be a turn-table coming into face to face contact with a frame round the screen, or the rotatable screen may be driven directly e.g. from frictional tangential contact with a driven wheel, or from a motor on a frame surrounding it.

The enlarger may additionally be provided with means for freeing the screen or screens of dust before being moved to a position in which they overlie the easel, and with means for presensitizing, by illuminating them, light-sensitive probes, used in the control of the exposure given to a photographic material in the enlarger. Setting of the level of presensitizing illumination and application of that light may occur simultaneously with positioning of a filter mount.

Photographic material exposed in the enlarger may be discrete sheets of film or may be a roll of film, in which case means may be provided for feeding appropriate areas of a roll of film successively across the easel of the enlarger.

A masking frame may be movably mounted on the easel of the enlarger, and may be operated by power means to be lowered on to sheet material on the easel before exposure of that material.

A particular embodiment of the invention will now be described with reference to the accompanying drawings wherein:

FIG. 1 is a perspective view of the enlarger,
FIG. 2 is a cross section of part of the enlarger, and
FIG. 3 is a cross section of another part of the enlarger.

Light from a light source within the enlarger head passes through the usual condenser system and through a transparency held in a transparency holder 1, to the objective lens 2 of the enlarger. The enlarger head is mounted on a supporting frame 3 for vertical movements. Mechanically joined to the lens mounting of the head is a carrier box 4 in which is borne a rotatable disc 5 having five apertures, four being occupied by the filters appropriate to the colour separation set to be prepared and one aperture being free of any filters. The disc 5 is drivable in rotation by an electric motor 6, and in the carrier box 4 there are mounted five micro-switches 7 of which the sensors are actuated in turn by an abutment part 49 on the disc 5. The positioning of the micro-switches 7 is such that when, upon their actuation by part 49, they stop the motor 6, an appropriate aperture is positioned in the light path between the lens 2 and an easel 8 of the enlarger. The easel 8 is at the centre portion of the upper surface of a bench 9 which forms the lower body of the enlarger. Above the easel 8 there is pivotally mounted on a rail 10 a pair of arms 11, constrained to move together, and driven through a crank mechanism by a pneumatic cylinder and piston (not shown). The arms 11 can either lie flush on the easel as shown, or lie at an angle of about 30° to the plane of the easel to allow photographic material to be placed under them upon the easel. The arms 11 carry between them an opaque mask 12 having a central window 13 through which exposures are made. When the arms 11 lie on the easel 8, the mask 12 lies flat on it, and means are provided for applying a reduced pressure of gas between it as well as the screens which will be described and the easel, to press them firmly down on to the material being processed.

A half-tone contact screen 14 has a rest position at one end of the bench 9, and is shown in that position in FIG. 1. A carrier frame 15 has (FIG. 2) a circular central recess which has a peripheral outwardly directed annular recess 16 in its radially inner wall. A ring 17 is of less height than the recess 16 and is rotatable relative to the frame 15. A second ring 18 fast with the ring 17 bears on its under surface a U-section soft rubber ring 19 with the mouth of the U directed radially inwardly, and the periphery of the contact screen 14 is grasped by the limbs of the U.

As has been mentioned, the height of the recess 16 is greater than that of the ring 17 and the downwardly facing surface of the recess 16 has a plurality of rolling bearings 20 spaced round it. However, the upwardly facing wall does not have such bearings. The effect of this is that when the ring 17 is lifted off the upwardly facing wall and urged upwardly against the bearings 20 it is free to revolve, but it is restricted by frictional action from revolution when in contact with the upwardly facing wall.

Means for causing rotation of the screen 14 is a turntable 21. This is mounted for rotation on an axle 22, and is drivable in rotation e.g. by tyred wheels 23 driven by linked electric ratchet motors 48. When the frame 15 is lowered the lower face of the rubber channel ring 19 comes into contact with the turntable 21 and the ring 17 is lifted off the upwardly facing wall of recess 16 so that rotations of the turntable 21 are communicated to the half-tone contact screen 14. A ring 50 is borne on the frame 15 and supports four micro-switches in the control circuit of the electric ratchet motors. These micro-switches may be locked at any selected point round the ring 40. An abutment on the ring 17 actuates these micro-switches when the ring 17 is rotated, so that the screen 14 may be brought to rest automatically at any set of predetermined positions.

Means for lifting the frame 15 include a carriage 24 slidably borne on a rail 25 of a pair of rails 25 and 26 which extend parallel for the whole length of the enlarger bench 9, above the bench's upper surface and at its rear. The carriage 24 has a lug 27 engaged with the piston rod 28 of a pneumatic cylinder 29 of which the base is borne in a triangular end plate 30, in which the ends of the rails 25 and 26 are also borne. An arm 31 extends from the carriage to the frame 15 and bears a roller 51 running on the rail 26.

At the other end of the bench 9, a second carriage 32 is borne on the rail 25 and is slidably displaceable along it by a second pneumatic cylinder and piston arrangement 33. An arm 40 extends from the carriage 32 to a frame 42, and a roller 52 on the arm runs on rail 26. A second end plate 34 corresponding to plate 30 supports the other end of the rails 25, 26 and the base of the cylinder 33.

The two end plates 30, 34 are rotatable about the axis of the rail 25 by being supported on brackets 37 standing upwardly from the end walls of the bench 9. The ends of the rails 26 are used as the points of action of the rods 38 of a pair of pneumatic pistons 39 pivotally mounted on the same end walls. Extension upwards of the rods 38 causes a tilting movement of the two ends 30, 34 as well as of the rails 25, 26 and a lifting or lowering the frame 15 of the half-tone carrier screen, as well as of frame 42. The frames 15 and 42 are pivoted, about a horizontal axis, to their respective arms 31, 40. The frame 42 bears in a window at its centre portion a clear screen 41. The screen 41 being clear there is no necessity for providing for its rotation of this screen.

Two cases (one of which, 53, is shown cut away) encase the screens 41, 14 when disposed in their rest positions at each end of the bench 9. The ends of these cases adjacent to the easel 8 are permanently open to permit ready entry and exit of the screens whilst the backs of the cases are permanently open to prevent restriction of the movement of the arms 38 and 40.

Mounted between the legs of the frame 3 is an instrument panel displaying readings from the condition of the enlarger. Mounted on the half-tone screen case 53 on the right hand end of the bench 9 is a metering panel to which are connected by means of flexible cables, two light sensitive probes used in setting up the enlarger.

Brushes (not shown) may be provided to brush the upper and lower surface of each screen while it is moving towards its operative position in which it is over the photographic material, on the easel 8 but the brushes are parted to be clear of the surfaces of the screens as they return to their rest positions. Ionised air may be blown at the screen at the same time, in a manner which is known in this art, and this air bearing any dust which may have accumulated on the screens is taken in by a vacuum cleaning device mounted within the bench 9 and filtered.

The operation of the enlarger is as follows: A sheet of photographic material is placed upon the easel 8 (the mask 12 having previously been raised) and the mask is then lowered. A selector switch 43 on a switch panel 44 on the front of the bench 9 is moved to cause the appropriate filter to be interposed between the lens and the easel. Rotation of the filter disc 5 continues until the appropriate micro-switch 7 is actuated. This same movement of the selector switch 43 causes appropriate rotation of the turntable 21 until the appropriate micro-switch is actuated bringing the turntable to rest and setting the angular position of the half-tone screen 14. The same movement of the selector switch 43 also alters the intensity with which the two lamps within the probe housing illuminate the cadmium sulphide probes within those same compartments.

The cadmium sulphide cells are to be used for the determination of the exposure needed in the flash and main exposures to be given to the photographic material. One of the probes is to be placed on the high light part of the image formed in the easel, the other on the position of lowest intensity of that image. The method of determining flash and main exposures using two probes in this manner is fully disclosed in the specification of my copending U.S. patent application No. 629,055 filed Mar. 30, 1967. The probes are used before each separation is exposed and therefore will receive a light of varying intensity according to the different filters placed in position and according to the basic colour of the transparency being enlarged. Cadmium sulphide cells have the disadvantage that they take some considerable time to attain a final reading particularly when the light intensity is low. To avoid this, I expose the cells to light before they are used. Methods of and means for doing this are described and claimed in the specification of my co-pending U.S. patent application No. 624,896 filed Mar. 21, 1967. As is there explained, I find the optimum results are obtained when the cells are exposed to a light intensity the same as or slightly greater than that which is expected. In that different filters always cut down "white" light by a known amount, the ordinary level of illumination expected at the image area for each filter is known, and in the present enlarger it is arranged that series resistances in the circuits of the lamps which gives the cells their presensitisation cause each lamp to give the respective cell illumination the same as or just greater than that expected.

The flash and main exposures may be applied simultaneously from the same light source by the method and means disclosed in the specification of my co-pending U.S. patent application No. 621,264 filed Mar. 7, 1967. The flash and main exposure may however be applied separately and/or from different sources. In either case, their values are determined and adjusted by the help of the two probes.

Then the selector switch 43 is moved to its next position and the following sequence of events occurs. The pistons 39 raise their rods 38 to tilt the rails 25, 26 and lift the carriage 15 from the top surface of the bench 9 of the enlarger. Pneumatic piston 29 extends its rod 28 to bring the frame 15 over the easel 8 and then release of air pressure in the cylinders 39, brings that frame with its contact screen down unto the window 13 of the masking frame 12. Vacuum is applied to draw the frame in the masking screen down unto the easel. In the next position of the selector switch 43 the flash and main exposures are given through the contact screen and the reverse sequence of movements of the pistons 39, 29 restores the contact screen to its rest position, in which it rests on the turntable 21 and is ready for rotation to its next angular position.

Next position of the selector switch 43 brings by an analogous series of events, the clear screen 41 across to the easel, and through this creen a shorter exposure is given after a mask to hide the image-bearing part of the material has been positioned, to define after development a margin round the image.

The clear screen 41 can be used to transport probes to and from the image area. Since only its margin portion is used to provide a photographic effect, obstructions at the middle portion of its surface area are not objectionable. If the probes are fixed temporarily to this screen, it is assured that readings of light values are obtained in identical positions for each colour record. In this case the clear screen 41 will be brought into position on the easel before the half-tone screen is used.

The next position of the selector switch brings the screen 41 back to its rest position and the next position of the switch 43 changes the position or lifts the mask 12 after which the sequence of operation can be repeated with another filter. If the screen is used for transporting probes, it will remain on the easel until after the filter change has occurred.

In a modification, film is passed across the easel from rolls borne in the upper part of the bench 9 and feeding of the film into two positions for exposure is also controlled by the selector switch.

Clearly, it is possible to make the whole of the operation, for all four exposures of a colour separation sequence, fully automatic by the incorporation of a mechanical timing and delay system, e.g. a multiple cam shaft driving micro-switches.

It may also be possible to combine the colour filters of the filter disc 5 with neutral density filters of certain value. By this means, it would be possible to compensate for the differing cutting down effect that colour filters have on "white" light by "pairing" each colour filter with a neutral density filter of certain specific density, so that an equal exposure will be given for each colour filter used.

Further it may be possible to gang the controls which govern the setting of the amounts of light giving the main and flash exposures so that there is no need for a compensating series of adjustments between these two controls adjustment to one usually being necessary as a consequence of an adjustment made to the other. Ganged controls of the right characteristic will avoid this necessity in that only a single setting operation would be required for the main illumination and a single setting operation for the flash illumination instead of the usual complex operation, in which a series of consequential diminishing corrections are made as a change in, say main exposure values alters the value of the flash exposure, and vice versa.

What I claim and desire to secure by Letters Patent is:

1. In a photographic enlarger for half-tone colour separation work, the improvement consisting in power means actuatable to bring the half-tone screen to and from the easel of the enlarger, and an automatic setting mechanism for setting the half-tone screen rotationally, said automatic setting mechanism including a rotatable member and means bringing the half-tone screen into engagement with the rotatable member when the half-tone screen is away from the easel of the enlarger.

2. The improvement defined in claim 1 wherein the half-tone screen is borne in a frame, a circular channel having a cylindrical base and two annular planar side walls in the frame, a ring mounting the half-tone screen and trapped in the channel, one side wall of the channel having rolling contact bearings, the other side wall to come into direct frictional contact with the ring whereby when the ring is urged towards the one side wall it is rotatable on the bearings, but when it is urged towards the other side wall rotation is resisted by the said frictional contact to lock the ring rotationally relative to the frame.

3. A photographic enlarger having
   (i) a projector for light and means for producing an image in light at the easel;
   (ii) a half-tone screen;
   (iii) a carrier for the half-tone screen;
   (iv) means permitting rotation of the screen relative to the carrier;
   (v) an enlarger bench;
   (vi) an easel which is part of the enlarger bench;
   (vii) power means for moving the half-tone screen to interpose it between the easel and the light projector from another part of the enlarger bench and for returning the half-tone screen thence;
   (viii) automatic means at the said other part of the enlarger bench for setting the half-tone screen rotationally;
   (ix) means for preserving the rotational setting of the half-tone screen during its movement to the easel from the said other part.

4. A photographic enlarger according to claim 3 having additionally
   (x) a second screen which is a clear screen;
   (xi) power means for moving the clear screen to interpose it between the easel and the light projector from another part of the enlarger bench and for returning it thence;
   (xii) means correlating the said two power means and the light projector whereby each screen is positioned at and removed from the easel and light projected through each automatically.

5. A photographic enlarger according to claim 4 wherein the two screens are mounted on carriages on a single set of rails extending along the enlarger bench, a pivotal mounting for the set of rails, power means for altering the attitude of the set of rails, the alteration is in attiude lifting or lowering the screens from or to the enlarger bench or easel.

6. A photographic enlarger according to claim 4 wherein an automatic filter changer is provided, the means (xii) correlating also the operation of the automatic filter-changer.

References Cited
UNITED STATES PATENTS 2,952,185  9/1960  Palmer et al. _____ 355—73
3,068,748  12/1962  Schutt et al. _____ 355—73

NORTON ANSHER, Primary Examiner

R. A. WINTERCORN, Assistant Examiner

U.S. Cl. X.R.

95—1; 355—71